(12) United States Patent
Franklin et al.

(10) Patent No.: US 7,531,916 B2
(45) Date of Patent: May 12, 2009

(54) PROTECTION CIRCUITS FOR HYBRID POWER SYSTEMS

(75) Inventors: Jerrold E. Franklin, Sacramento, CA (US); James M. Oros, Carmichael, CA (US)

(73) Assignee: Altergy Systems, Inc., Folsom, CA (US)

( * ) Notice: Subject to any disclaimer, the term of this patent is extended or adjusted under 35 U.S.C. 154(b) by 367 days.

(21) Appl. No.: 10/855,206

(22) Filed: May 26, 2004

(65) Prior Publication Data
US 2005/0275983 A1 Dec. 15, 2005

(51) Int. Cl.
*H02J 7/34* (2006.01)
*H02H 3/20* (2006.01)
*H02H 3/24* (2006.01)

(52) U.S. Cl. .............................. 307/64; 307/66; 361/90

(58) Field of Classification Search .................. 307/64; 361/90
See application file for complete search history.

(56) References Cited

U.S. PATENT DOCUMENTS

| | | | | |
|---|---|---|---|---|
| 5,659,208 | A | * | 8/1997 | Kimble et al. ............... 307/82 |
| 5,818,670 | A | * | 10/1998 | Ahn ............................ 361/18 |
| 5,903,449 | A | | 5/1999 | Garrigan et al. ............ 320/101 |
| 6,137,277 | A | * | 10/2000 | Rajda et al. ................. 323/301 |
| 6,255,008 | B1 | * | 7/2001 | Iwase ............................ 429/9 |
| 6,326,763 | B1 | | 12/2001 | King et al. .................... 363/41 |
| 6,503,649 | B1 | | 1/2003 | Czajkowski et al. .......... 429/23 |
| 6,534,950 | B2 | | 3/2003 | LeBoe ......................... 320/104 |
| 6,548,877 | B2 | * | 4/2003 | Yang et al. ................... 257/382 |
| 6,573,682 | B1 | | 6/2003 | Pearson ....................... 320/101 |
| 6,590,370 | B1 | | 7/2003 | Leach .......................... 323/299 |
| 6,794,844 | B2 | * | 9/2004 | Hochgraf et al. ............ 320/101 |
| 6,841,275 | B2 | * | 1/2005 | Pearson ......................... 429/9 |
| 6,949,843 | B2 | * | 9/2005 | Dubovsky .................... 307/64 |
| 7,064,967 | B2 | * | 6/2006 | Ichinose et al. .......... 363/56.01 |
| 7,405,495 | B2 | * | 7/2008 | Guillarme et al. ............. 307/82 |
| 2003/0044658 | A1 | | 3/2003 | Hochgraf et al. ............ 429/22 |
| 2003/0080622 | A1 | | 5/2003 | Koenig ......................... 307/64 |
| 2003/0113594 | A1 | | 6/2003 | Pearson ......................... 429/9 |
| 2003/0113599 | A1 | | 6/2003 | Pearson ....................... 429/23 |
| 2003/0184256 | A1 | | 10/2003 | Kopf et al. .................. 320/101 |
| 2004/0009380 | A1 | | 1/2004 | Pearson ....................... 429/23 |
| 2004/0170038 | A1 | * | 9/2004 | Ichinose et al. ............. 363/95 |
| 2005/0083715 | A1 | * | 4/2005 | Guillarme et al. ............ 363/65 |

* cited by examiner

*Primary Examiner*—Stephen W Jackson
*Assistant Examiner*—Hal I Kaplan
(74) *Attorney, Agent, or Firm*—John P. O'Banion

(57) ABSTRACT

A power management and protection system is provided for a hybrid fuel cell system. The hybridization includes a fuel cell stack and an energy storage device (ESD) having either batteries, ultracapacitors, or both, in parallel with the fuel cell for delivering power to an electrical load. Voltage and current protection is provided to the stack, ESD, and load by use of a two stage control system. The first stage limits the current drawn from the stack and the charging rate of the ESD and provides for the voltage output to be within an adjustable predetermined range to prevent an over-voltage condition on the ESD and the load and an under-voltage condition in the stack. The second stage limits the current delivered to the load to an adjustable predetermined level, prevents an under-voltage condition on the load, and prevents rapid discharge of the ESD in the case of a short circuit.

18 Claims, 4 Drawing Sheets

PROTECTION CIRCUITS FOR HYBRID POWER SYSTEMS

BACKGROUND

1. Field of Invention

The present invention relates to energy systems that include fuel cells and other primary power devices.

2. General Background

Fuel cells are electrochemical devices that convert the chemical energy of a reaction directly into electrical energy without combustion and without harmful emissions. The basic physical structure, or building block, of a fuel cell consists of an electrolyte layer in contact with a porous anode and cathode on either side. A schematic representation of a fuel cell with the reactant/product gases and the ion conduction flow directions through the cell is shown in FIG. 1.

In a typical fuel cell, gaseous fuels are fed continuously to the anode (negative electrode) and an oxidant (i.e., oxygen from air) is fed continuously to the cathode (positive electrode); the electrochemical reactions take place at the electrodes to produce an electric current, water and heat. A fuel cell, although having components and characteristics similar to those of a typical battery, differs in several respects. The battery is an energy storage device. The maximum energy available is determined by the amount of chemical reactant stored within the battery itself. The battery will cease to produce electrical energy when the chemical reactants are consumed (i.e., discharged). In a secondary battery, the reactants are regenerated by recharging, which involves putting energy into the battery from an external source. The fuel cell, on the other hand, is an energy conversion device that theoretically has the capability of producing electrical energy for as long as fuel and oxidant are supplied to the electrodes.

Individual fuel cells are typically connected in a series arrangement or stack in order to increase the overall potential and power output. The voltage and current output and therefore the power output of a fuel cell system depend on the number of cells in the stack, total active surface area and efficiency.

A common type of fuel cell is the Proton Exchange Membrane (PEM) fuel cell. The electrolyte in this fuel cell is an ion exchange membrane (fluorinated sulfonic acid polymer or other similar polymer) that is an excellent proton conductor. The only liquid in this fuel cell is water, and thus corrosion problems are minimal. Because of the limitation on the operating temperature imposed by the polymer, usually less than 100 C, a $H_2$-rich fuel is used. If a fuel cell is compared to an equivalent efficiency heat engine, the fuel cell does not need to achieve the large temperature differential to achieve the same Carnot cycle efficiency as the heat engine. This is because of the added energy gained from Gibbs free energy as opposed to simply the thermal energy. The resulting freedom from large temperature differentials in the fuel cell provides a great benefit because it relaxes material temperature problems when trying to achieve comparable efficiency.

The actual cell potential is decreased from its ideal equilibrium potential because of irreversible losses, as shown in FIG. 2. Multiple phenomena contribute to irreversible losses in an actual fuel cell. The losses, which are called polarization, overpotential, or overvoltage, originate primarily from three sources: 1) activation polarization, 2) ohmic polarization, and 3) concentration polarization. These losses result in a cell voltage (V) that is less than its ideal potential, E (V=E− Losses). The activation polarization loss is dominant at low current density. At this point, electronic barriers must be overcome prior to current and ion flow. Activation losses increase as current increases. Ohmic polarization (loss) varies directly with current, increasing over the entire range of current because cell resistance remains essentially constant. Gas transport losses occur over the entire range of current density, but these losses become prominent at high limiting currents where it becomes difficult to provide enough reactant flow to the cell reaction sites.

The fuel cell will normally operate in the linear portion of the curve shown in FIG. 2. Consequently the cell potential varies as the load changes. In the example of FIG. 2 the linear portion encompasses a potential range of about 0.5 volts to about 0.9 volts and the open circuit potential is even higher. While variation of 0.4 volts may not appear to be a large fluctuation it can have significant impact on the operation of a stack of fuel cells. As an example, assume a stack of 20 cells performing as the curve of FIG. 2 shows. Accordingly, this stack will have an output potential of 10 to 18 volts and may have an open circuit potential of over 20 volts.

Much modern electronic equipment that operates at a nominal 12 volts DC will not function when presented with a voltage outside a narrow range, e.g., 11-14 volts. Some equipment, when sensing a high potential at the power input will not turn on for safety and self protection reasons. Similarly, if a low potential is sensed at the power input the equipment will not turn on or shut itself down if the potential drops below the minimum level during operation.

While a fuel cell stack can be sized for an expected load range, there can be times in which a load fluctuation can result in a higher current than expected such as start transients. In this situation, as the current increases the stack potential is reduced and may be reduced below what is required for the equipment load to operate. Another circumstance is an extremely high load condition or short circuit. In this case the cell voltage can be driven close to zero and may result in damage to the cell if such a condition persists.

In the past, efforts have been made to mitigate voltage fluctuations and other variant conditions by using energy storage devices (ESDs), such as batteries or ultracapacitors (also called supercapacitors) across the output of the fuel cell and in parallel with the load, thereby creating a hybrid fuel cell/ESD system. Such hybrid systems can provide greater stability than fuel cell only systems, but the prior art systems have not provided adequate protection to the fuel cell, the ESD, and the load from voltage and current variations in the system. Therefore, there is a need for a hybrid fuel cell/ESD energy system that minimizes the potential for damage to its components from adverse voltage and current conditions.

SUMMARY OF THE INVENTION

The present invention is a power management system 10 comprising (i) a stack of fuel cells 20, (ii) an energy storage device 30 (ESD), (iii) first protection circuitry 40, and (iv) second protection circuitry 50. The first protection circuitry 40 may act as an input current limiter (by limiting the current drawn into the system from the fuel cell) and a voltage current limiter (by limiting the voltage applied to the ESD and to the load). The second protection circuitry 50 may act as an output current limiter, by limiting the current from the system to the load. The present invention can protect against damage to the load, fuel cell stack, and ESD caused by fluctuations in voltage and current. Also, since it has an ESD, the system according to the present invention extends the optimal operational range for a limited period of time in the case of load spikes.

DETAILED DESCRIPTION

Figure 3:
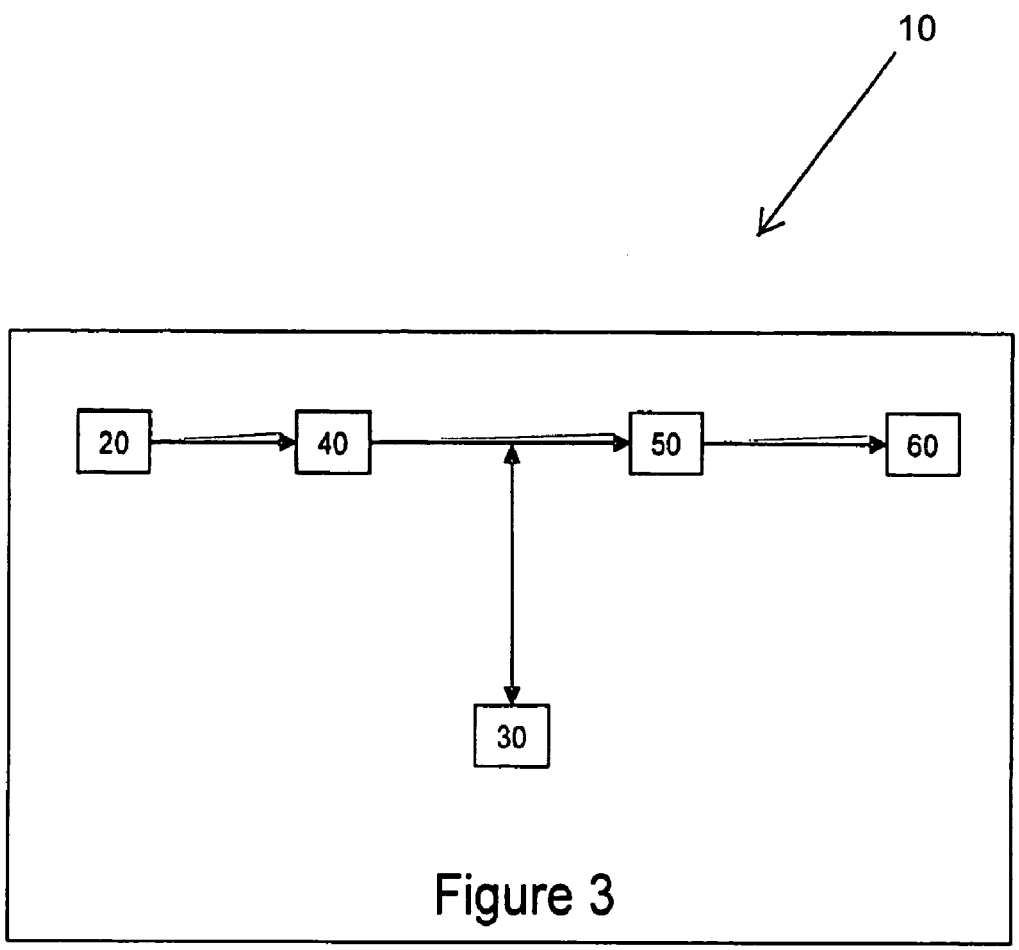
FIG. 3 is a block diagram of a power management system according to an embodiment of the present invention.

The power management system 10 of the present invention has (i) a stack of fuel cells 20, (ii) an energy storage device 30 (ESD), (iii) first protection circuitry 40, and (iv) second protection circuitry 50. See FIG. 3. The invention provides protection to the fuel cell stack 20, the ESD 30, and a load 60, and also provides improved consistency and robustness of operation over conventional systems.

Fuel Cell Stack

Figure 1:
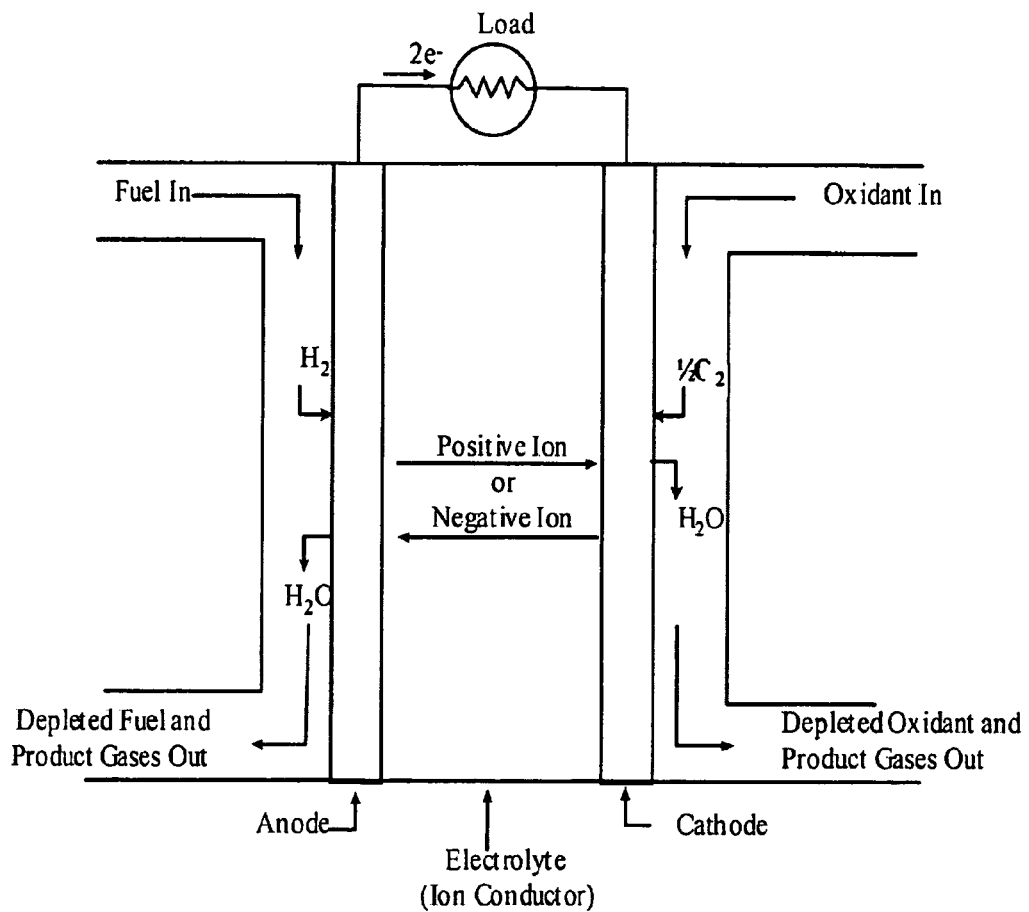
FIG. 1 illustrates a typical fuel cell.
Figure 2:
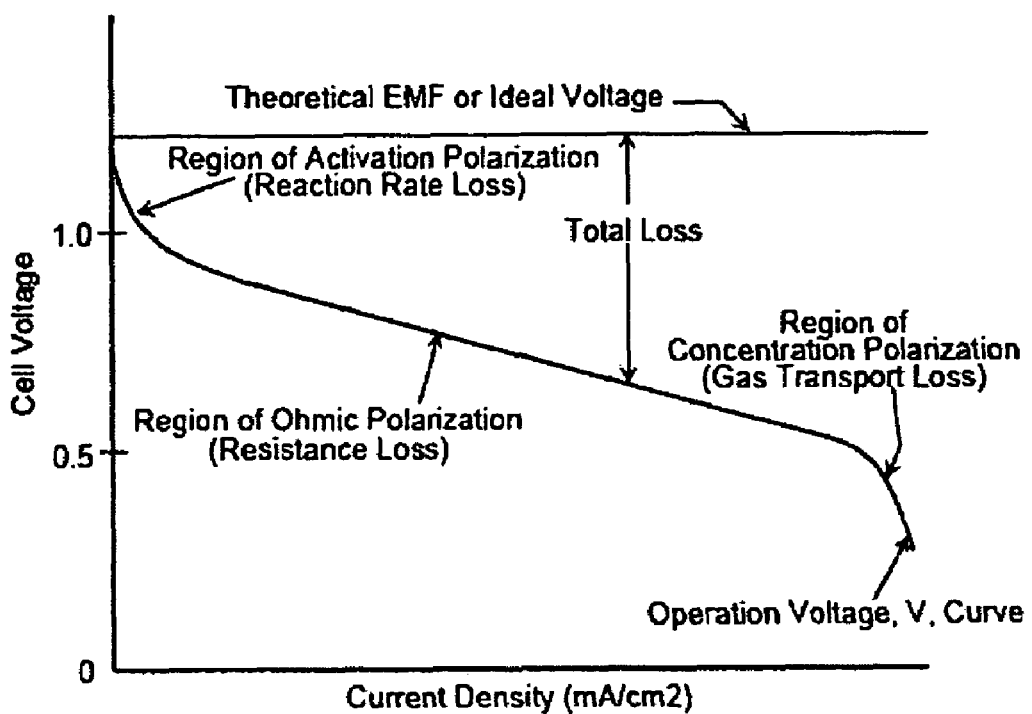
FIG. 2 is a chart showing the relationship between current density and cell voltage for a typical fuel cell.
Figure 4:
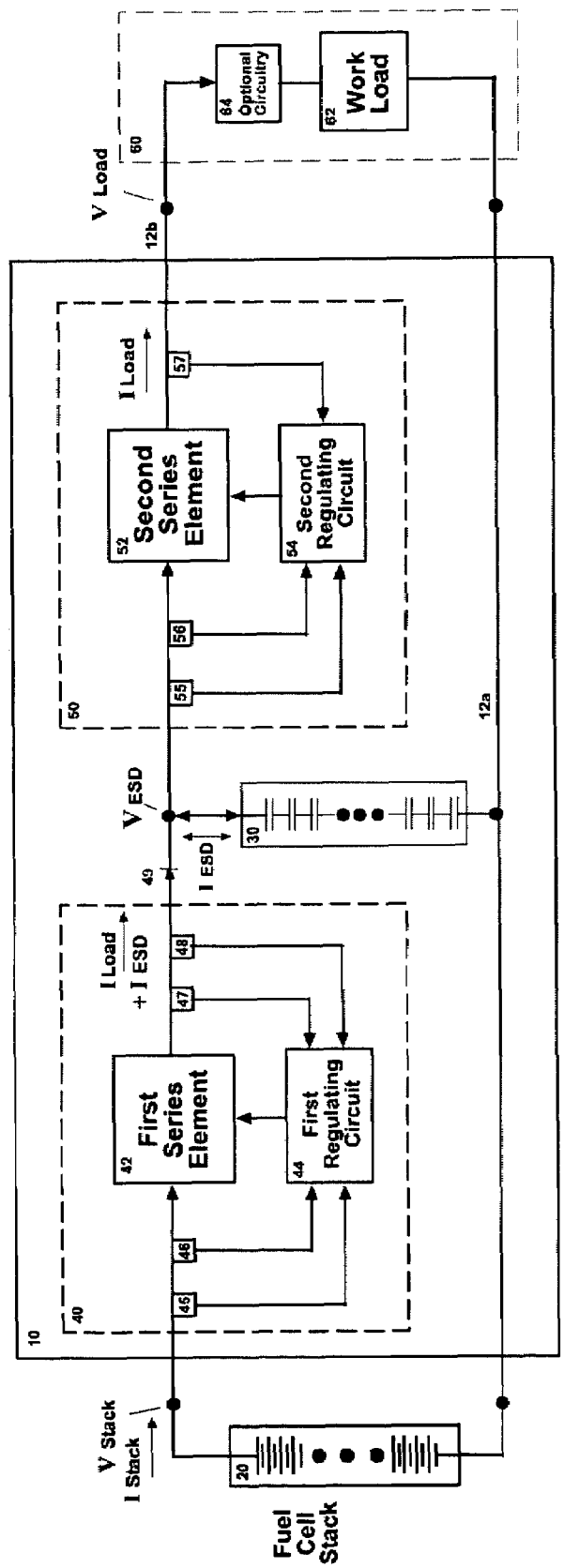
FIG. 4 is a schematic of a power management system according to an embodiment of the present invention.

The fuel cell stack 20 can be virtually any fuel cell assembly, including but not limited to a PEM fuel cell stack. In one embodiment, the fuel cell stack 20 is capable of continuously delivering a nominal 50 watts of power and operates according to the curve shown in FIG. 2, i.e., a single cell potential of 0.5 to 0.9 volts. The fuel cell in this example has an operational range of 10 to 18 volts with a nominal output at 50% efficiency of 12 volts at 4.2 amps. As shown in FIG. 4, the fuel cell stack 20 may be coupled to the first protection circuitry 40, the ESD 30, and the load 60 through the second protection circuitry 50. The fuel cell stack 20 produces a stack voltage $V_{stack}$ across a bus 12a, 12b. The stack current $I_{stack}$ flows to the load 60 from the fuel cell stack 20 via the bus 12a, 12b. In lieu of the fuel cell stack 20, other primary power devices, such as batteries, generators, or solar or other alternative power generating devices can be used.

ESD

The ESD 30 may be a battery, ultracapacitor (also known as a supercapacitor), or other energy storage device. In one embodiment, the ESD may have a capacity of 14 V. As shown in FIG. 4, the ESD 30 may be electrically coupled in parallel with the fuel cell stack 20 across the bus 12a, 12b to power the load 60. The ESD is also coupled to the first protection circuitry 40 and the second protection circuitry 50. The open circuit voltage of the ESD 30 is selected to be similar to the full load voltage of the fuel cell stack 20.

The ESD 30 allows the system to accommodate load fluctuations. The ESD 30 acts as a buffer, absorbing excess current when the fuel cell stack 20 produces more current than the load 60 requires until the ESD is fully charged, and providing current to the load 60 when the fuel cell stack 20 produces less current than the load 60 requires.

First Protection Circuitry

In one embodiment, the first protection circuitry 40 may comprise a first series element 42. This first series element 42 may serve two functions. First, it may act as an input current limiter, by limiting the current $I_{stack}$ drawn into the ESD 30 and the second series element 52 from the fuel cell 20. In one embodiment, it may limit the current so that it is no greater than 5 amperes.

Second, the first series element 42 may act as a voltage limiter, by limiting and controlling the voltage to the ESD 30. In one embodiment, when acting as a voltage limiter, the first series element 42 will not deliver power to a load if the fuel cell potential is under 10 volts and does not allow the output voltage to the ESD to exceed 14 volts. In addition, the first series element controls the potential applied $V_{ESD}$ to the ESD 30 and the second series element 52.

These two features—input current limiting and voltage protection—are particularly important when ultracapacitors are used. When such capacitors are completely discharged they initially appear as a short circuit, and can draw large amounts of current. The input current limiter prevents the capacitors from drawing a high current from the fuel cell, and the voltage limiter will not allow the charging of the capacitors until the fuel cell can deliver at least 10 volts. Also, the voltage limiter sets the maximum voltage seen by the capacitors to prevent their overcharging to an excessively high voltage, which can damage the capacitors.

Although the first series element 42 can act as both the input current limiter and the voltage limiter, the present invention also includes embodiments in which the input current limiting and voltage limiting functions are distributed to more than one component.

The first series element 42 is electrically connected between the fuel cell stack 20 and ESD 30 and also electrically connected between the fuel cell stack 20 and the second series element 52.

The first series element 42 can take the form of a field effect transistor ("FET"); an example being International Rectifier's 1RL7833/S/L family of power metal oxide semiconductor field effect transistors ("MOSFET") having a drain and source electrically coupled between the fuel cell stack 20 and the ESD 30 and having a gate electrically coupled to an output of the first regulating circuit 44.

The first protection circuitry 40 also contains a first regulating circuit 44 coupled to the series element 42 to control the series element 42, via a control signal, based on various operating parameters of the fuel cell system 10. See FIG. 4

A number of sensors work with the first regulating circuit 44. A first low threshold voltage sensor 45 is used to sense the output voltage $V_{stack}$ of the fuel cell stack 20. If the stack voltage $V_{stack}$ is below a predetermined error level, the voltage applied to the first protection circuitry 40 through the first threshold voltage sensor 45 will be below the threshold error level of the first regulating circuit 44, and the first regulating circuit 44 will cause the series element 42 not to conduct.

Additionally, a stack current sensor 46 is used to sense the current $I_{stack}$ being delivered by the fuel cell stack 20. If the stack current $I_{stack}$ is above an adjustable predetermined error level the control circuit 44 causes a reduction of conduction through the series element 42.

Next, at the output of the series element 42 a high voltage error sensor 47 and a second low threshold voltage error sensor 48 are placed. If the high voltage error sensor 47 indicates that the voltage being applied to the ESD $V_{ESD}$ is in excess of an adjustable predetermined error level, the first regulating circuit 44 will cause the series element 42 to cease conduction. If the second low threshold voltage sensor 48 indicates that the ESD voltage $V_{ESD}$ is below a predetermined adjustable error level, such as caused by a short circuit, the first regulating circuit 44 will cause the series element 42 to reduce conduction.

A reverse current blocking diode 49 can be placed between the series element 42 and the ESD 30 to prevent current from flowing from the ESD 30 back through the series element 42 and to the fuel cell stack 20.

The first protection circuitry 40 can take the form of Linear Technology Corporation's LT1641-1/-2 family of controllers along with additional support circuitry.

Second Protection Circuitry

Like the first protection circuitry 40, the second protection circuitry 50 comprises a series element, namely the second series element 52. The second protection circuitry 50 acts as an output current limiter, by preventing the drawing of excessive current from both the fuel cell 20 and the ESD 30 by a higher than specified load. This could be in the form of an improperly applied load, a load spike, or a shorted output. If the output current limiter detects excessive current being drawn, the limiter opens the current source to protect the fuel cell stack 20 and to prevent the ESD 30 from delivering excessive current.

The second series element 52 is electrically connected between the ESD 30 and the load 60, and also electrically connected between the first series element 42 and the load 60. The second series element 52, acting as the output current limiter controls the flow of current $I_{load}$ from the ESD 30 and the first series element 42 to the load 60. See FIG. 4. In addition, the second series element controls the potential applied $V_{load}$ to the load 60.

The second series element 52 can take the form of a field effect transistor ("FET"); an example being International Rectifier's IRL7833/S/L family of power metal oxide semiconductor field effect transistors ("MOSFET") having a drain and source electrically coupled between the ESD 30 and the load 60 and having a gate electrically coupled to an output of the second regulating circuit 54.

The second protection circuitry 50 also contains a second regulating circuit 54 coupled to the series element 52 to control the second series element 52, via a control signal, based on various operating parameters of the fuel cell system 10. See FIG. 4.

A number of sensors work with the second regulating circuit 54. For instance, in one embodiment, a first low threshold voltage error sensor 55 is used to sense the voltage $V_{ESD}$ across the ESD 30. If the ESD 30 voltage $V_{ESD}$ is below an adjustable predetermined error level, the voltage applied to the second protection circuitry 50, will be below the threshold voltage level of the second regulating circuit 54, and therefore the second regulating circuit 54 will cause the second series element 52 not to conduct.

Additionally, a load current error sensor 56 may be used to sense the current $I_{load}$ being drawn by the load 60. If the load current $I_{load}$ is above an adjustable predetermined error level the second regulating circuit 54 causes a reduction of conduction through the second series element 52.

At the output of the second series element 52 is a second low threshold voltage error sensor 57. If the load voltage $V_{load}$ is below an adjustable predetermined error level or if there is a short circuit, the control circuitry will cause a reduction of conduction through the second series element 52.

The voltage sensors of the above discussion may be in the form of voltage divider networks or other circuitry well known to those skilled in the art.

The regulating circuits of the above embodiments may take the form of one or more microprocessors which are programmed to regulate the current through the series element.

The second stage control circuitry 50 can take the form of Linear Technology Corporation's LT1641-1/-2 family of controllers along with additional support circuitry.

Load

The load 60 may include the work load 62 and other external circuitry 64, such as an inverter or DC/DC converter or other power conditioning circuitry. See FIG. 4.

Operation and Benefit of Present Invention

As described above, the present invention can protect against damage to the load, fuel cell stack, and ESD caused by fluctuations in voltage and current. Also, since it has an ESD, the system according to the present invention the present invention extends the optimal operational range for a limited period of time in the case of load spikes.

Although specific embodiments of, and examples for, the power management system and method are described herein for illustrative purposes, various equivalent modifications can be made without departing from the spirit and scope of the invention, as will be recognized by those skilled in the relevant art. For example, the teachings provided herein can be applied to fuel cell systems 10 including other types of fuel cell stacks 20 or fuel cell assemblies, not necessarily the PEM fuel cell assembly generally described above. Additionally, the fuel cell system 10 can make use of digital circuitry such as microprocessors to monitor and control the various fuel cell system parameters. The various embodiments described above can be combined to provide further embodiments.

We claim:

1. A system for powering a direct-current electrical load, comprising:

a fuel cell stack configured as a primary power device for producing electrical power in response to the supply of fuel and oxidant;

said fuel cell stack having a cell potential that varies in response to load changes;

a first protection circuit coupled to said fuel cell stack;

a fuel cell output current sensor coupled to said first protection circuit;

a fuel cell output voltage sensor coupled to said first protection circuit;

a first protection circuit output voltage sensor coupled for sensing the output voltage from said first protection circuit;

an energy storage device (ESD) coupled to said first protection circuit and configured for providing current to the load when the fuel cell stack produces less current than the load requires;

wherein said ESD is selected from the group consisting of a supercapacitor, an ultracapacitor, and a battery;

wherein said first protection circuit regulates current supplied to said ESD, and reduces current supplied to said ESD in response to detecting a current level from said fuel cell output current sensor which exceeds an adjustable predetermined threshold;

wherein said first protection circuit ceases conduction in response to said fuel cell output voltage sensor detecting that fuel cell output voltage is below a predetermined threshold;

wherein said first protection circuit limits the voltage applied to said ESD in response to the output of said first protection circuit output voltage sensor;

a second protection circuit coupled to said enemy storage device (ESD) and configured for outputting a fixed voltage driving the electrical load of the system;

an ESD output current sensor coupled to said second protection circuit;

an ESD output voltage sensor coupled to said second protection circuit;

a second protection circuit output voltage sensor coupled for sensing the output voltage from said second protection circuit;

wherein said second protection circuit controls the amount of current being supplied from said ESD to the load in response to detecting current level from said ESD output current sensor;
wherein said second protection circuit ceases conduction in response to the ESD output voltage sensor detecting a low voltage condition below a predetermined threshold;
wherein said second protection circuit limits the voltage applied to the load in response to detecting a low voltage condition from said second protection circuit output voltage sensor.

2. The system according to claim 1, wherein said first and/or second protection circuits comprise regulators.

3. The system according to claim 2, wherein said first and/or second protection circuits incorporates a series element through which current is regulated.

4. A system for powering a direct-current (DC) electrical load comprising:
a fuel cell stack configured as a primary power device;
an energy storage device (ESD) coupled with the primary power device and configured for providing current to the load when the fuel cell stack produces less current than the load requires;
ESD-load protection circuitry coupled with the ESD and the load;
wherein said ESD-load protection circuitry comprises an ESD-load regulating circuit;
wherein said ESD-load protection circuitry additionally comprises a first low threshold voltage error sensor coupled to said ESD-load regulating circuit;
wherein said ESD-load protection circuitry additionally comprises a load current sensor; and
ESD-stack protection circuitry coupled with the fuel cell stack, the ESD, and the ESD-load protection circuitry;
wherein said ESD-stack protection circuitry comprises a first series element, and said ESD-load protection circuitry comprises a second series element.

5. The system according to claim 4, wherein said ESD-stack protection circuitry additionally comprises an ESD-stack regulating circuit.

6. The system according to claim 5, wherein said ESD-stack protection circuitry additionally comprises a first low threshold voltage error sensor coupled to said ESD-stack regulating circuit.

7. The system according to claim 6, wherein said ESD-stack protection circuitry additionally comprises a stack current sensor.

8. The system according to claim 7, wherein said ESD-stack protection circuitry additionally comprises a high voltage error sensor coupled to said ESD-stack regulating circuit.

9. The system according to claim 8, wherein said ESD-stack protection circuitry additionally comprises a second low threshold voltage error sensor coupled to said ESD-stack regulating circuit.

10. The system according to claim 9, wherein said ESD-stack protection circuitry additionally comprises a reverse current blocking diode.

11. The system according to claim 4, 5, 6, 7, 8, 9, or 10, wherein said ESD-load protection circuitry additionally comprises a second low threshold voltage error sensor coupled to said ESD-load regulating circuit.

12. The system according to claim 4, additionally comprising a regulating circuit for regulating current through the ESD-load protection circuitry in response to one or more of the following: an energy storage device low voltage threshold error, a load current error; or a load under-voltage error.

13. The system according to claim 12:
wherein said ESD-stack protection circuitry further comprises an ESD-stack regulating circuit; and
wherein said ESD-stack regulating circuit comprises:
a fuel cell stack high current error detection sensor;
a fuel cell stack low voltage threshold error detection sensor;
an energy storage device over-voltage error detection sensor; and
an energy storage device under-voltage error detection sensor.

14. The system according to claim 4, wherein the first series element comprises a field effect transistor.

15. The system according to claim 4 or claim 14, wherein the second series element comprises a field effect transistor.

16. A system for powering a direct-current (DC) electrical load comprising:
a fuel cell stack configured as a primary power device;
an energy storage device (ESD) configured for providing current to the load when the fuel cell stack produces less current than the load requires, said ESD coupled with the primary power device;
wherein said ESD is selected from the group consisting of a supercapacitor, an ultracapacitor, and a battery;
an ESD-load protection circuitry coupled with the ESD and the load;
wherein said ESD-load protection circuitry comprises an ESD-load regulating circuit;
wherein said ESD-load protection circuitry additionally comprises a first low threshold voltage error sensor coupled to said ESD-load regulating circuit;
wherein said ESD-load protection circuitry additionally comprises a load current sensor;
an ESD-stack protection circuitry coupled with the fuel cell stack, the ESD, and the ESD-load protection circuitry; and
at least one regulating circuit
comprising a microprocessor programmed to regulate the current in the system by:
(a) sensing the fuel cell output current to determine if the current being drawn from the fuel cell stack is higher than the error limit;
(b) sensing the fuel cell stack output voltage to determine if this voltage is above the low threshold error limit;
(c) sensing the voltage applied to the energy storage device to determine an over or under-voltage error condition;
(d) sensing the current being delivered to the load to determine if the load current is higher than the error limit;
(e) sensing the voltage being applied to the load to determine if the voltage is lower than the load low voltage error condition; and
(f) applying a control signal in response to one or more of (a) through (e).

17. A system for powering a direct-current (DC) electrical load comprising:
a fuel cell stack configured as a primary power device;
an energy storage device (ESD) configured for providing current to the load when the fuel cell stack produces less current than the load requires, said ESD coupled with the primary power device;
wherein said ESD is selected from the group consisting of a supercapacitor, an ultracapacitor, and a battery;
first protection circuitry coupled with the fuel cell stack and the ESD; and
second protection circuitry coupled with the ESD, the load, and the first protection circuitry;

wherein said first protection circuitry comprises a first series element, and said second protection circuitry comprises a second series element;

wherein said first protection circuitry additionally comprises a first regulating circuit;

wherein said first protection circuitry additionally comprises a first low threshold voltage error sensor coupled to said first regulating circuit;

wherein said first protection circuitry additionally comprises a stack current sensor;

wherein said first protection circuitry additionally comprises a high voltage error sensor coupled to said first regulating circuit; and wherein said first protection circuitry additionally comprises a second low threshold voltage error sensor coupled to said first regulating circuit.

18. The system according to claim 17, wherein said first protection circuitry additionally comprises a reverse current blocking diode.

* * * * *